United States Patent
Ashikhmin (10) Patent No.: US 9,455,816 B2
(45) Date of Patent: Sep. 27, 2016

(54) INTERFERENCE CANCELLATION IN TDD MASSIVE MIMO WIRELESS SYSTEMS

(71) Applicant: ALCATEL LUCENT, Boulogne-Billancourt (FR)

(72) Inventor: Alexei Ashikhmin, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 124 days.

(21) Appl. No.: 14/175,533

(22) Filed: Feb. 7, 2014

(65) Prior Publication Data
US 2015/0229459 A1    Aug. 13, 2015

(51) Int. Cl.
H04B 7/005    (2006.01)
H04W 4/00    (2009.01)
H04L 5/00    (2006.01)
H04L 5/14    (2006.01)
H04B 7/02    (2006.01)
H04B 7/06    (2006.01)
H04B 7/04    (2006.01)

(52) U.S. Cl.
CPC ............. *H04L 5/0073* (2013.01); *H04B 7/024* (2013.01); *H04B 7/0452* (2013.01); *H04B 7/065* (2013.01); *H04B 7/0617* (2013.01); *H04L 5/0032* (2013.01); *H04L 5/0048* (2013.01); *H04L 5/14* (2013.01)

(58) Field of Classification Search
CPC . H04L 5/0073; H04L 5/0032; H04L 5/0048; H04L 5/14; H04B 7/024; H04B 7/065; H04B 7/0452; H04B 7/0617
See application file for complete search history.

(56) References Cited

U.S. PATENT DOCUMENTS 8,654,771 B1 * 2/2014 Singh ................ H04W 28/0247
                                                        370/328
2013/0156021 A1    6/2013 Ashikhmin et al.

OTHER PUBLICATIONS

Motahari, Abolfazl Seyed et al., "Real Interference Alignment: Exploiting the Potential of Single Antenna Systems", Department of Electrical and Computer Engineering, University of Waterloo, Waterloo, ON, Canada N2L3G1 {abolfazl,shahab,khandani}@cst.uwaterloo.ca, Department of Electrical Engineering and Computer Sciences, University of California-Berkeley, CA USA, maddaha@eecs.berkeley.edu; arXiv:0908.2282v2[cs.It], Nov. 24, 2009, pp. 1-17.

(Continued)

*Primary Examiner* — Kiet G Tang
(74) *Attorney, Agent, or Firm* — Mendelsohn Dunleavy, P.C.; Steve Mendelsohn (57) ABSTRACT

Directed inter-cell interference experienced by the downlink of a massive MIMO wireless communication network base station due to pilot contamination that occurs as a result of pilot signal reuse is significantly reduced by encoding signals to be transmitted over the downlink into robust signals. The robust signals along with corresponding beamforming vectors are transmitted over the downlink where the beamforming vectors are estimated by the base station using received fast fading pilot sequences. The encoding is performed by an interference cancellation algorithm whose use is proper when the communication network can be characterized as having one transmitter at each of its nodes (i.e., the base stations) and all the channel coefficients of the network are known by every node.

19 Claims, 4 Drawing Sheets

(56) References Cited

OTHER PUBLICATIONS

Ashikhmin, Alexei et al., "Pilot Contamination Precoding in Multi-Cell Large Scale Antenna Systems", 2012 IEEE International Symposium on Information Theory Proceedings, Jul. 1, 2012, pp. 1137-1141.

PCT International Search Report, PCT/US2015/014174, International Filing Date Feb. 3, 2015, Mailed Apr. 23, 2015, 4 pgs.

* cited by examiner

INTERFERENCE CANCELLATION IN TDD MASSIVE MIMO WIRELESS SYSTEMS

FIELD OF THE INVENTION

The present invention generally relates to wireless communication networks and specifically to a method for reducing significantly downlink signal interference within such networks.

BACKGROUND OF THE INVENTION

A cellular wireless network is a communication network comprising one or more cells where each cell has a base station (or cell site) comprising an antenna. The antenna may be a MIMO (Multiple Input Multiple Output) antenna comprising M antenna elements where M is an integer equal to 2 or greater. The term "antenna elements" refer to separate and independently controllable antennas that are part of one structure. In practice, M can be 100, 500 or even 1000 or more; thus the term massive MIMO. A cell is a defined geographical area having a base station assigned thereto so that mobile terminals located within the cell are able to communicate—via the base station—with other mobile terminals within the cell of the base station or with mobile terminals in other cells; a mobile terminal may also communicate with other communication devices of other communication networks (e.g., landline telephones of the Public Switched Telephone Network (PSTN) or the Internet) depending on whether the cellular network is connected to such other networks.

The base station further comprises transmitter, receiver and signal and information processing equipment that convey (i.e., transmit and/or receive) information to mobile terminals and to other equipment (e.g., other base stations) of the cellular network where such processing equipment and other equipment include equipment that control and/or operate the base stations and the entire communication network. Further, the base stations are connected to each other typically via communication links sometimes referred to as back-haul communication links. The base stations use these back-haul links for, inter alia, communicating information to each other or to other equipment of the cellular network where such information are data (e.g., voice, video, graphics or any combination thereof) being conveyed within the network or information relating to the operation and/or control of the cellular network. The back haul links are typically implemented with optical links or other media with which communication channels having relatively large bandwidths can be constructed.

The mobile terminals are user owned and/or controlled transceiver devices (e.g., cellular telephones) that are registered (by their users) to the cellular network for subscription to the network to allow such users to avail themselves of the communication services being provided by the cellular network. The mobile terminals are able to convey (i.e., transmit and/or receive) information in various forms (e.g., voice, data, text, video, graphics or any combination thereof) to other mobile terminals or to other communication devices that are not part of the cellular network (landline phones, for example). The information is conveyed via one or more base stations and equipment of the cellular communication network. A mobile terminal may communicate with a base station of a cell in which the mobile terminal is currently physically located and, at the same time or at a different time, the mobile terminal may communicate with a base station of one or more neighboring cells or other cells of the cellular network.

Certain wireless cellular networks are considered to be TDD (Time Division Duplex) networks whereby uplink transmissions and downlink transmissions occur at different assigned time slots, but both types of transmissions use the same frequency band or bands. Uplink transmissions are transmissions from mobile terminals to base stations. Downlink transmissions are transmissions from base stations to mobile terminals.

The communication channels through which information between the base stations and the mobile terminals is conveyed are the media (air space including structures, objects and obstacles in the pertinent air space) through which or around which signals between any particular mobile terminal and a base station propagate. The signals may also be partially or totally reflected and/or absorbed by the various structures or obstacles. As with any communication network, the information transmitted through a channel is often adversely affected by anomalies in the channel such as noise, interference, phase jitter, frequency translation and other anomalies that typically occur in communication channels.

To achieve proper and effective downlink communications between the base stations and the mobile terminals, each base station first determines the characteristics of the communication channels between it and mobile terminals (in its cell or in other cells) to which it is conveying (i.e., transmitting and/or receiving) information. The base station then uses the channel characteristics associated with a particular mobile terminal to transmit information to the mobile terminal, which may be located in the cell of said base station or in another cell.

The communication channel characteristics are represented by fast fading coefficients (FFC) and slow fading coefficients (SFC). Mobile terminals that have been registered and are subscribers to the cellular networks are provided with at least two types of pilot signals, which they can transmit at network defined time instances to base stations capable of receiving and processing said pilot signals. A registered mobile terminal is a terminal that has entered into a subscription agreement with the owner and/or operator of the network resulting in the network recognizing and allowing the terminal access to the communication network and the services provided thereby. Mobile terminals typically transmit one type of pilot signals (i.e., FFC pilot sequences) that the base stations use to determine fast fading coefficients and another type of pilot signal (SFC) that the base stations use to determine slow fading coefficients.

The base stations and mobile terminals have a priori knowledge of the pilot signals; that is, each pilot signal is one of a network defined set of signals (or a set of signal sequences) with characteristics known to all of the base stations and registered mobile terminals in the cellular network. Some or all of the characteristics (e.g., amplitude, relative phase, frequency) of a transmitted pilot signal received by a base station will have been affected by the media (i.e., channel for that pilot) through which that pilot signal propagated. The pilot signals received by the base stations are processed by said base stations in a well known manner to derive the channel characteristics, viz., slow fading and fast fading coefficients associated with each mobile terminal that transmitted the pilot signals. The fast fading coefficients, as their name suggests, represent channel characteristics that change relatively frequently over time and/or the change has a relatively wide range. A slow fading coefficient between a base station and a mobile terminal represents the transmit signal power attenuation, i.e. it represents the loss of the signal power during signal's propagation from the base station (mobile terminal) to the mobile terminal (the base station). The slow fading coefficients changes relatively slowly over time. They are also approximately constant within a circle with the radius of several meters.

For the FFC pilot sequences, which are used to derive the fast fading coefficients, each is, by definition, a vector containing q components where q is an integer equal to 2 or greater. The term pilot vectors or pilot sequences (or FFC pilot vectors; FFC pilot sequences) are hereinafter used interchangeably with the term FFC pilot signals. The network may thus define a set of K (note that K≤q) (an integer equal to 2 or greater) q-component pilot signals each of which is orthogonal to the other (K−1) q-component pilot signals. Thus, for example, for FFC pilot sequences $r_k$ and $r_u$ where k≠u and (k, u, =1, . . . , K) and $\underline{r}_k$, $\underline{r}_u$ each is an FFC pilot signal from the set of K network defined pilot signals with each pilot signal having q components, $\underline{r}_k \cdot \underline{r}_u = 0$; and for u=k, $\underline{r}_k = \underline{r}_u$ and so $\underline{r}_k \cdot \underline{r}_u = \underline{r}_k \cdot \underline{r}_k = 1$. The maximum possible number of orthogonal q-tuples is q. Therefore we have that only K≤q orthogonal FFC pilots can be generated. Because of this and because the pilot signals are transmitted synchronously by various mobile terminals throughout the network, the transmission of non-orthogonal (e.g., identical pilot signals) FFC pilot sequences by different mobiles in different cells (neighboring cells, for example) at the same time does occur resulting in the pilot signals interfering with each other; this phenomenon is referred to as pilot contamination. Consequently, the fast fading coefficients derived from the transmitted non-orthogonal FFC pilot sequences will contain errors. The fast fading coefficients between a given base station and a given mobile terminal form an M-dimensional vector, since each of the M antennas has its own fast fading coefficient. This vector is called fast fading coefficient vector.

The slow fading coefficients estimated with the use of SFC pilot signals are not affected by this pilot contamination problem and are not affected by the channel anomalies as much, due to their relatively stable and slow varying characteristics, and because these coefficients are derived using a different and more numerous set of pilot signals. Each base station uses FFC pilot sequences to estimate the fast fading coefficient vectors (also referred to as Channel State Information, i.e., CSI) between it and the mobile terminals located in the cell of the base stations. The base stations use their CSI estimates to process uplink signals from the mobile terminals located in the cells of the base stations. The CSI estimates are also used in downlink transmissions from base stations to corresponding mobile units. The data for this downlink transmission is received by base stations from back-haul lines.

TDD wireless networks achieve relatively high data transmission rates through their uplinks and downlinks. However, several problems prevent such networks from achieving even higher data transmission rates—especially for downlink transmissions. The problems are due to interference caused by the pilot contamination issue discussed above where the reuse of the same FFC pilot vectors (i.e., FFC pilot sequences) is unavoidable, and to other sources of interference. The interference resulting from two or more synchronously transmitted identical (or at least nonorthogonal) pilot signal sequences is referred to as directed inter-cell interference. Because the same FFC pilot sequence is used by several mobile terminals the estimates of the fast fading coefficient vectors are corrupted. A base station uses these corrupted estimates to generate M-dimensional beamforming vectors that point not only to the mobile terminal located in the cell of the base station, but also to terminals located in the neighboring cells; this results in the directed inter-cell interference.

As a result of the directed inter-cell interference, several problematic issues arise: (i) the directed inter-cell interference does not disappear even as M (i.e., the number of antenna elements per base station) tends to infinity; (ii) estimation errors in the estimates of the fast fading coefficient vectors are also due to additive noise in the hardware of base station receivers; these estimation errors corrupt the beamforming vectors, which are part of the downlink signals transmitted by the base stations. This results in indirect intra-cell and inter-cell interferences; (iii) As M—the number of antenna elements at each base station—increases and tends to infinity, the fast fading coefficient vectors (or CSI) become mutually orthogonal; however, because M is finite, the vectors are not orthogonal and this causes additional indirect inter-cell and inter-cell interferences; (iv) mobile terminals do not know the effective channel gain between themselves and a base stations (i.e., the amount of signal amplification needed to be done by a mobile terminals in transmitting information to the base station of the cell in which the mobile terminal is physically located); because the mobile terminals have to estimate such a gain, the error due to estimation reduces the Signal to Interference Noise Ratio (SINR) of the downlinks.

As the number of antennas M, increases, the interferences in (ii), (iii) and (iv) above get progressively smaller. As M approaches infinity, the interferences due to (ii), (iii) and (iv) approach zero. However, in sharp contrast, the directed inter-cell interference caused by the pilot contamination problem increases with M. As such, even with an infinitely large M, the directed inter-cell interference becomes the main and only reason for a lack of increase in the SINR to relatively large values. Thus, the directed inter-cell interference resulting from pilot contamination prevents the SINR from increasing even with increasing M and consequently inhibits the network from increasing its downlink transmission rates.

BRIEF SUMMARY OF THE INVENTION

The present invention provides a method for reducing directed inter-cell interference that occurs in the downlink of a base station of a massive MIMO wireless communication network due to the existence of pilot contamination resulting from by pilot reuse. Each base station has an antenna structure comprising M antennas; in certain embodiments, M can be 100, 500 or even 1000 or more.

First, slow fading coefficients for the downlink are estimated by the base station using received slow fading pilot signals. The base station then transmits the estimated slow fading coefficients to all other base stations of the communication network. The base station then forms an aggregate set from its slow fading coefficients and the slow fading coefficients received from all the other base stations of the communication network. All of the other base stations also form an aggregate set of slow fading coefficients in the same manner. The base station also receives fast fading coefficient pilot signals or pilot sequences which it uses to estimate fast fading channel coefficients. When the same (or non-orthogonal) pilot sequences are used by several mobile terminals the estimates of fast fading coefficients becoming corrupted. The base station forms beamforming vectors where each such vector is the ratio of the estimated fast fading coefficient vector and its norm. The net effect of the use of the beamforming vectors is that the fast fading coefficients between a base station and any the mobile terminal are positively aligned (i.e., the do not interfere with each other) and therefore the signal transmission between this base station and the mobile is characterized by the corresponding slow fading coefficient.

Consequently, the massive MIMO antenna at each base station can be reasonably approximated as one antenna with corresponding slow fading coefficients and, further all such coefficients are known by every base station of the network through the use of the aggregate set. The resulting communication network can thus be characterized as a network where each of its nodes has one transmitter and all the nodes know all the coefficients (i.e., the remaining slow fading coefficients) of the communication network. Such a characterization allows the base station to use a selected interference cancellation algorithm, which uses the slow fading coefficients to encode signals to be transmitted over the downlink into robust signals. The robust signals premultiplied by the beamforming vectors are then transmitted from the M base station antennas over the downlink.

DETAILED DESCRIPTION

The present invention provides a method for reducing directed inter-cell interference that occurs in the downlink of a base station of a massive MIMO wireless communication network due to the existence of pilot contamination resulting from by pilot reuse. Each base station has an antenna structure comprising M antennas; in certain embodiments, M can be 100, 500 or even 1000 or more.

First, slow fading coefficients for the downlink are estimated by the base station using received slow fading pilot signals. The base station then transmits the estimated slow fading coefficients to all other base stations of the communication network. The base station then forms an aggregate set from its slow fading coefficients and the slow fading coefficients received from all the other base stations of the communication network. All of the other base stations also form an aggregate set of slow fading coefficients in the same manner. The base station also receives fast fading coefficient pilot signals or pilot sequences which it uses to estimate fast fading channel coefficients. When the same (or non-orthogonal) pilot sequences are used by several mobile terminals the estimates of fast fading coefficients becoming corrupted. The base station forms beamforming vectors where each such vector is the ratio of the estimated fast fading coefficient vector and its norm. The net effect of the use of the beamforming vectors is that the fast fading coefficients between a base station and any the mobile terminal are positively aligned (i.e., the do not interfere with each other) and therefore the signal transmission between this base station and the mobile is characterized by the corresponding slow fading coefficient.

Consequently, the massive MIMO antenna at each base station can be reasonably approximated as one antenna with corresponding slow fading coefficients and, further all such coefficients are known by every base station of the network through the use of the aggregate set. The resulting communication network can thus be characterized as a network where each of its nodes has one transmitter and all the nodes know all the coefficients (i.e., the remaining slow fading coefficients) of the communication network. Such a characterization allows the base station to use a selected interference cancellation algorithm, which uses the slow fading coefficients to encode signals to be transmitted over the downlink into robust signals. The robust signals premultiplied by the beamforming vectors are then transmitted from the M base station antennas over the downlink.

The method of the present invention may be implemented with a general purpose computer, and/or a processor operating in accordance with software instructions at least consistent with the method of the present invention and coupled to signal transmission, signal reception circuitry and information processing circuitry that form part of the equipment or hardware of the base station. The circuitry may be analog, digital and/or a combination of both. All or part of the circuitry may be controlled with microprocessor based circuitry (analog and/or digital) operated and/or controlled by software and/or firmware instructions at least consistent with or which reflect the method of the present invention. The method of the present invention may further be implemented with a digital signal processor and associated circuitry for processing received signals, signals to be transmitted and other signals that are used to control and/or operate the base station and the wireless cellular communication network in accordance with instructions consistent with or which reflect the steps of any one or more embodiments of the method of the present invention. The method of the present invention may yet further be implemented using any combination of a general purpose computer executing instructions in accordance with the method of the present invention, a digital signals processor, one or more microprocessors and associated memory and I/O circuitry or any combination thereof.

Figure 5:
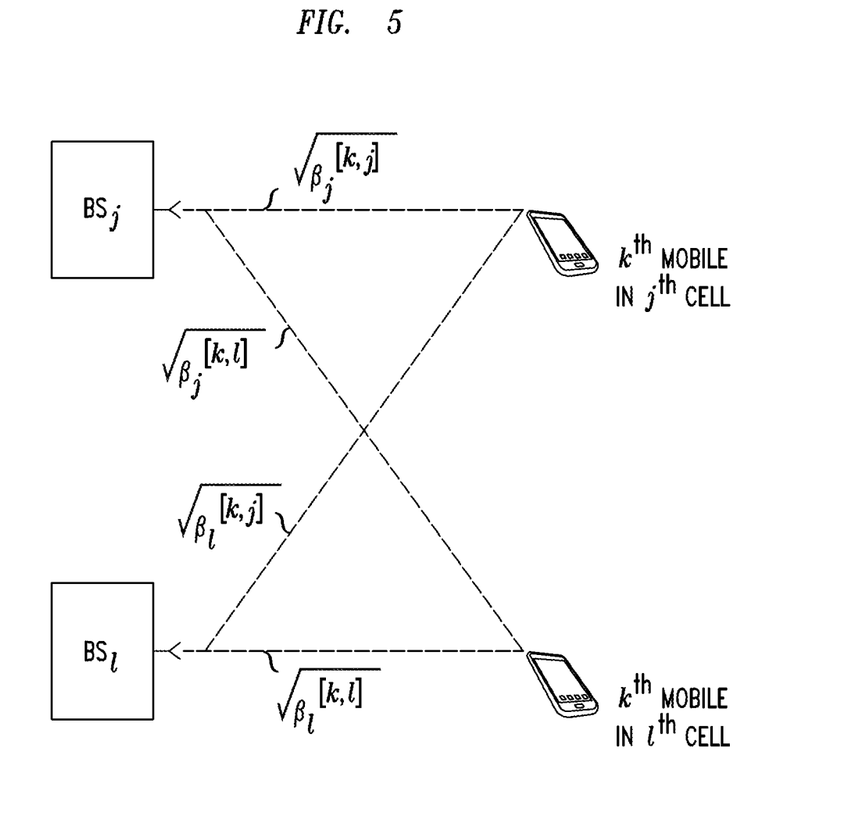
FIG. 5 is a depiction of two different cells of a type of wireless network in which interference cancellation algorithms can be used to reduce inter-cell interference.
Figure 6:
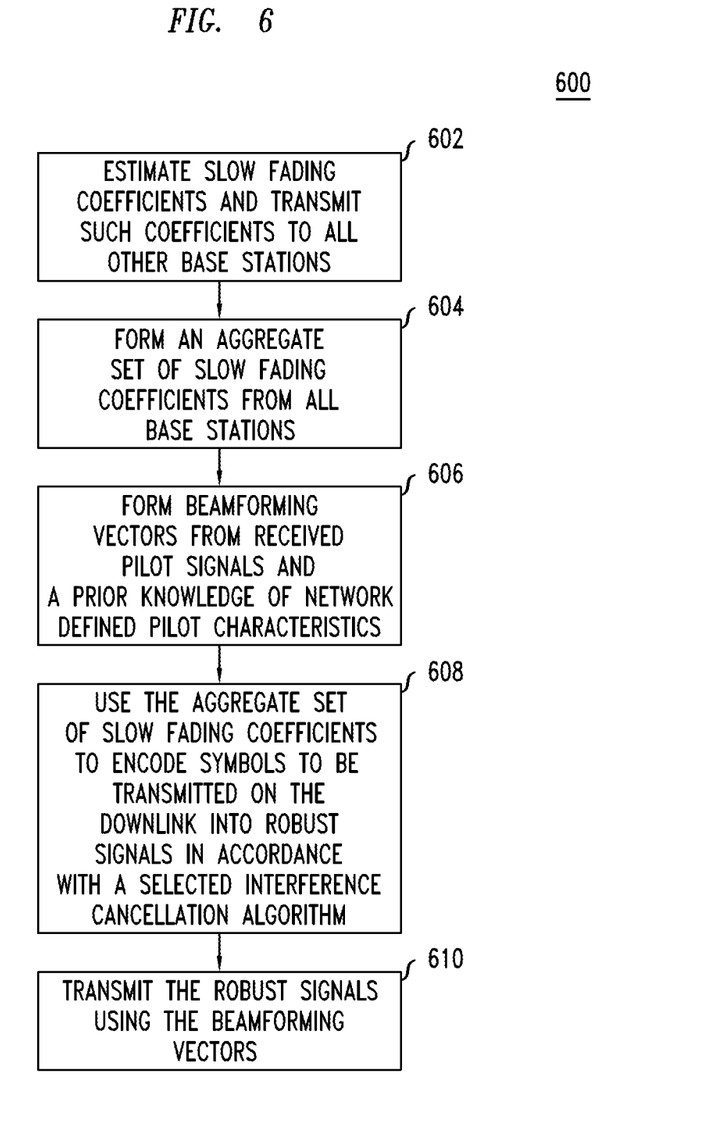
FIG. 6 is a flowchart of the method of the present invention.

Referring to FIG. 6, the steps of the method of the present invention are shown. The steps will now be described with reference to FIGS. 1-5 at various points in the description. For ease of explanation, the method of the present invention will be explained by discussing the steps performed by one base station (and associated equipment) of a wireless cellular network. However, it will be understood that the method of the present invention comprises scenarios in which all of the base stations or any subset (i.e., one or more) of the base stations of a network perform the steps of the method of the present invention at the same time or at different times. For ease of description, the method of the present invention will be described in the context of a wireless cellular communication network comprising L cells (where L is an integer equal to 2 or greater), each cell having an antenna comprising M antenna elements (where M is an integer equal to 2 or greater). Throughout the following description of the method of the present invention, several variables are used to represent scalar and vector quantities. Vector quantities will appear in bold font. Also, the identification of particular steps of the method as depicted in FIG. 6 will also appear in bold font.

In step 602, focusing on one of the base stations of the network, that particular base station estimates its slow fading coefficients from (SFC) pilot signals it received from mobile terminals registered with and which are subscribers to the cellular communication network. Hereinafter, the slow fading coefficients will be represented mathematically by the variable β. The SFCs do not depend on frequency. Thus, in the case of OFDM transmission, any single OFDM tone can be used to for transmitting SFC pilot sequence. Typically the number, say J, of OFDM tones is usually large, like J=1000 or larger. Thus J mobiles can use different OFDM tones for transmitting their SFC pilot sequences. Those SFC pilot sequences, since they are transmitted as different OFDM tones, will not create any interference with respect to each other. The slow fading coefficients, β, are then estimated by the base station, in a well known manner; for example, pilot signals transmitted as per an OFDM (Orthogonal Frequency Division Multiplexing) protocol by mobile terminals are processed by the base station to extract the particular slow fading coefficient, which is a real and nonnegative number. The base station then transmits each set of slow fading coefficients associated with each received pilot signal to all other base stations of the cellular network. The slow fading coefficients, β, are typically transmitted from one base station to the other base stations via back haul links of the network. A back haul link has a relatively high bandwidth, high capacity communication channel. The back haul links are typically implemented with optical fiber links or other media/equipment that provide relatively large bandwidth capacity. Typically, the base stations are connected to each other via back haul links.

In step 604, the base station forms an aggregate set of slow fading coefficients, β, from its own generated coefficients and the slow fading coefficients it has received from all other base stations of the communication network. This is because the other base stations of the network perform the same tasks described in step 602 above; that is, each of the other base stations also transmits its set of slow fading coefficients over a backhaul link to the entire network of base stations. As a consequence, all of the base stations of the network contain the same aggregate set of slow fading coefficients. In sum, for a defined period of time, all of the slow fading coefficients, β, of the network are known by every base station.

Figure 1:
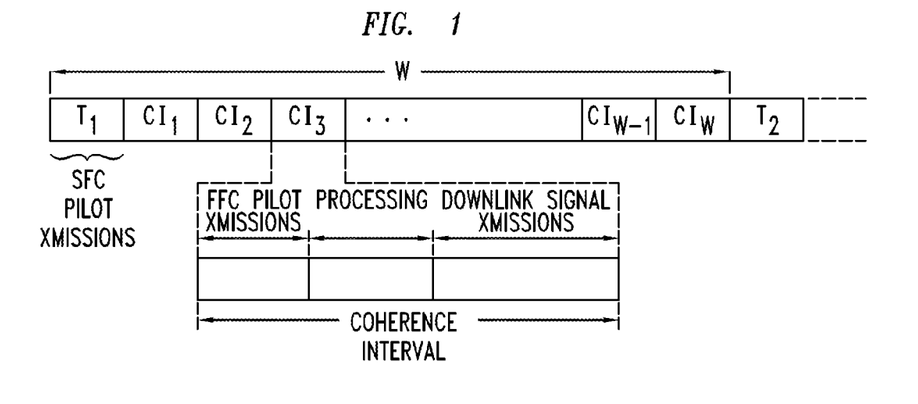
FIG. 1 shows a time period that defines a TDD protocol for downlink transmissions of a massive MIMO cellular wireless network.

Referring temporarily to FIG. 1, a time interval referred as a super coherence interval shows the relative time relationship and time protocol followed by the base stations and mobile terminals for certain uplink and downlink transmissions. Also shown is a time interval, T, that occurs prior to the commencement of each super coherence interval wherein the SFC pilot signals are transmitted by mobile terminals in accordance with a certain protocol to allow the receiving base stations to estimate the slow fading coefficients β. One example of a protocol to be used for such transmissions is the use of OFDM (Orthogonal Frequency Division Multiplexing) tones for sending SFC pilot sequences by different mobile terminals during assigned time instances to mobile stations. An OFDM channel comprising a plurality of multiplexed channels (tones) provides the set of channels assigned to each of the pilot signals that is transmitted to the base stations by the mobile terminals. Each mobile is assigned an OFDM channel and a transmission time within time interval T during which it transmits its SFC pilot signals.

The super coherence interval comprises W coherence intervals (where W is an integer equal to 2 or greater). In one embodiment, W=40 indicating that transmission time periods for SFC pilot signals are separated in time by 40 coherence intervals. The format for all coherence intervals is shown using the third coherence interval (i.e., $CI_3$). In particular, the coherence time interval comprises three distinct time periods each of which can be divided into sub-periods. The first time period identifies a time interval during which mobile terminals registered to the cellular communication network transmit FFC pilot sequences to base stations for the estimation of fast fading coefficient vector h; h will be also referred to as a fast fading channel vector. The estimation of fast fading channel vectors, h, will be described infra. The second time period identifies a time interval during which the base stations at least process the received FFC pilot sequences, which result in the estimation $\hat{h}$ of the fast fading channel vector h; the base stations may perform other network related processing during this time period. The third time period identifies a time interval during which base stations send information carrying (or data carrying) signals that they have received from other base stations or network hubs and controllers over the back haul links mobile. The information or data can be, for example, voice, video, text, graphics, or any combination thereof. The information is carried by communication signals referred to as symbols, S. A symbol is typically destined for a mobile terminal in the same cell as the base station that received the symbol.

Figure 2:
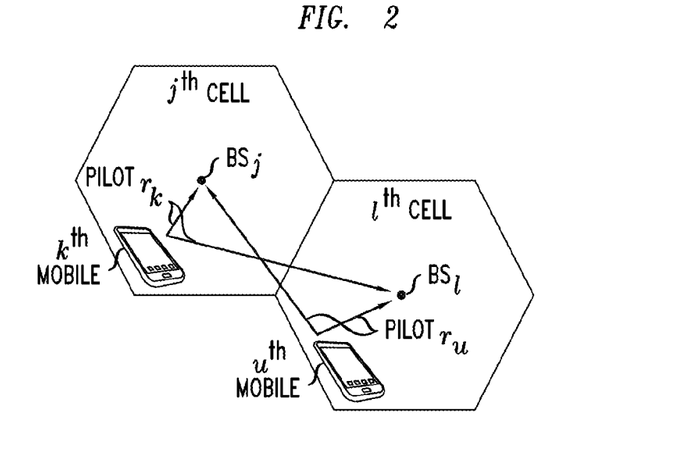
FIG. 2 shows orthogonal pilot signal uplink transmissions of representative mobile terminals in different cells of a massive MIMO cellular wireless network.

Referring now, temporarily to FIG. 2, two neighboring cells of a cellular network comprising L cells each having an antenna comprising M antenna elements are shown. For ease of explanation, only two neighboring cells are shown and discussed. The $j^{th}$ cell has base station j ($BS_j$) and the $l^{th}$ cell has base station 1 ($BS_1$). Further, the $k^{th}$ mobile terminals located in the $j^{th}$ cell is transmitting FFC pilot sequence $r_k$ and the $u^{th}$ mobile terminal located in the $l^{th}$ cell is synchronously transmitting FFC pilot sequence $r_u$. Each of the base stations has an antenna comprising M elements where M is an integer equal to 2 or greater. The entire network, during a particular time span when the transmission and reception events discussed herein are occurring, contains τ registered mobile terminals. In many cases, the number of mobile terminals τ is much greater than the number of FFC pilots sequences, K, that the network has defined. As a result, the defined FFC pilot reuse is performed thus leading to the problem of pilot contamination. Each of the mobile terminals has an index (1, 2, 3, . . . k, . . . u, . . . , K) corresponding to the pilot signal assigned to the mobile terminal. Thus, as shown in FIG. 2, the $k^{th}$ mobile is transmitting FFC pilot $r_k$ and the $u^{th}$ mobile terminal is transmitting is transmitting FFC pilot $r_u$. Each of the pilot signals is actually a sequence of pilot signal components of which there are q (note that K≤q). As such, each mobile terminal, when transmitting an FFC pilot sequences is actually transmitting a sequence containing q signals.

Figure 3:
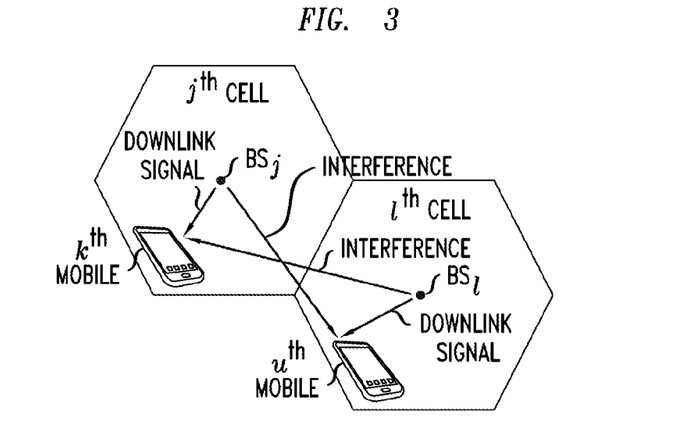
FIG. 3 shows downlink transmissions of signals and interfering signals from base stations of two different cells.

A pilot contamination situation with respect to FIG. 2 would occur when the mobile terminals in the $j^{th}$ cell and the $l^{th}$ cell are both transmitting pilot $r_k$ where both mobile terminals have the same assigned index k. The mobile terminal transmissions, which are uplink transmissions, are not only received by the base station in which the mobiles are located but are also received by other base stations such as neighboring base stations. Similarly, downlink transmissions from the base stations to the mobile are received by mobiles in other cells in addition to the mobile for which the transmission was intended. The interference is thus the simultaneous reception of two or more non-orthogonal signals (by base stations or mobile terminals in different cells) over the uplink or downlink (as shown in FIG. 3) channels. When the two or more different signals are orthogonal to each other, the interference is significantly reduced or eliminated. Otherwise, the signals interfere with each other.

In step 606, the base station forms beamforming vectors W using the FFC pilot signals it has received (during the first portion of the coherence interval; see FIG. 1) and its a priori knowledge of the FFC pilot sequences. In particular, upon receipt of the FFC pilot sequences, the base station estimates the fast fading channel vector, h, from the received FFC pilot sequences in a well known manner and gets an estimate ĥ. However, in the case of pilot reuse, the estimated fast fading channel vector will contain errors resulting in an estimate ĥ which will be significantly different from the actual vector, h. Consequently, the downlink transmission rate will be adversely affected. The beamforming vector, W, is defined by the following equation:

$$W = \frac{\hat{h}}{\|\hat{h}\|}.$$

Figure 4:
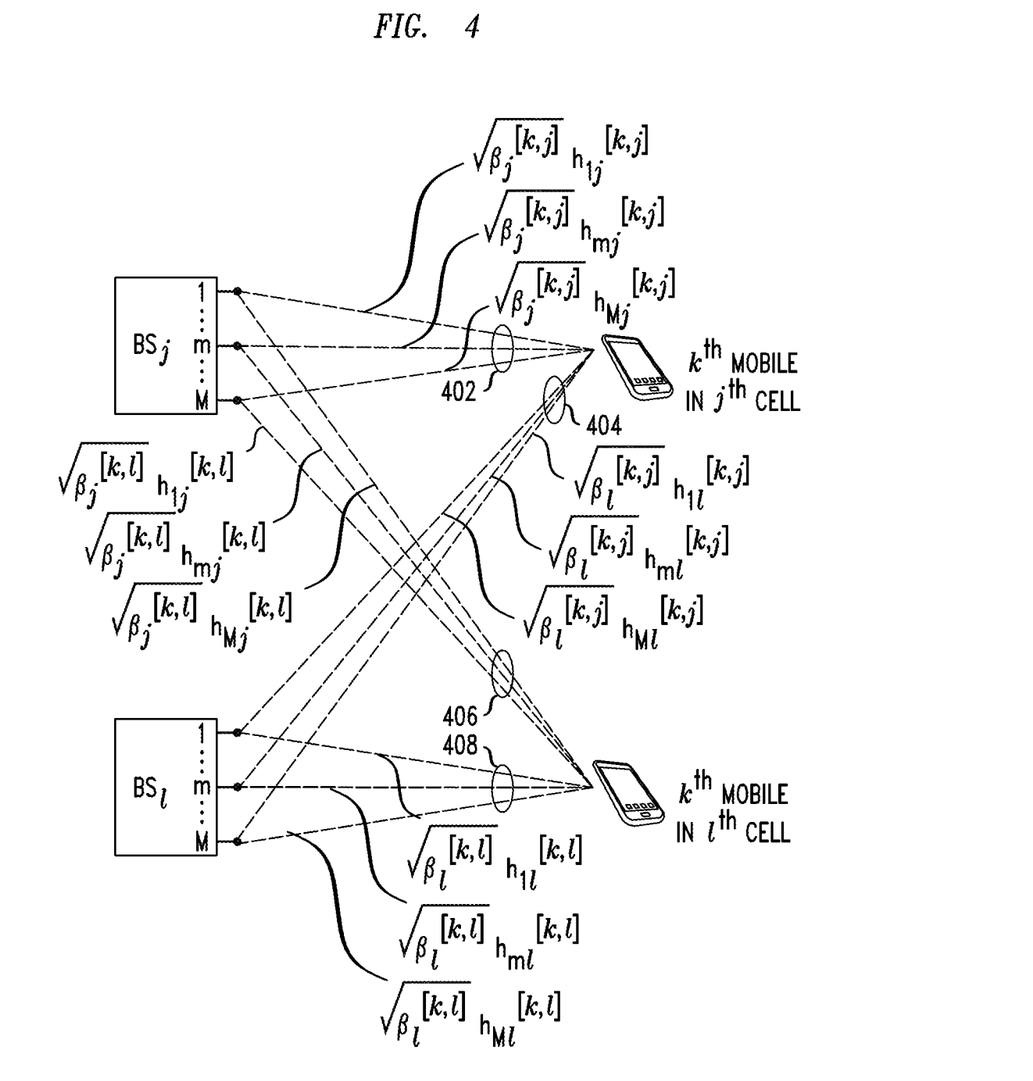
FIG. 4 shows slow fading and fast fading coefficients between base stations and representative mobile terminals in two different cells.

Referring temporarily to FIG. 4, a portion of a cellular network operating in accordance with the method of the present invention is shown wherein two base stations j ($BS_j$) and l ($BS_l$) are transmitting downlink signals to their respective $k^{th}$ mobile terminals. FIG. 4 shows the details of the various slow fading and fast fading coefficients of the channels and interference channels. As shown, channel 402 contains the information that $BS_j$ is transmitting to mobile terminal k in cell j. Channel 408 contains the information that $BS_l$ is transmitting to mobile terminal k in cell l. Channel 406 is the interference experienced by mobile k of cell l from $BS_j$. Channel 404 is the interference experienced by mobile k of cell j from $BS_l$. The slow fading coefficients are defined as follows: $\beta_j^{[kj]}$ is the slow fading coefficient between the $j^{th}$ base station and the $k^{th}$ mobile located in cell j; $\beta_j^{[kl]}$ is the slow fading coefficient between the $j^{th}$ base station and the $k^{th}$ mobile located in cell l; $\beta_l^{[kl]}$ is the slow fading coefficient between the $l^{th}$ base station and the $k^{th}$ mobile station in cell l; $\beta_l^{[kj]}$ is the slow fading coefficient between the $l^{th}$ base station and the $k^{th}$ mobile station in cell j. The fast fading coefficients are defined as follows: $h_j^{[kj]}=(h_{1j}^{[kj]}, h_{2j}^{[kj]}, \ldots, h_{Mj}^{[kj]})$ is the fast fading channel vector between the M antenna elements of the $j^{th}$ base station and the $k^{th}$ mobile terminal located in the $j^{th}$ cell; $h_j^{[kl]}=(h_{1j}^{[kl]}, h_{2j}^{[kl]}, \ldots, h_{Mj}^{[kl]})$ is the fast fading channel vector between the M antenna elements of the $j^{th}$ base station and the $k^{th}$ mobile terminal in the $l^{th}$ cell; $h_l^{[kl]}=(h_{1l}^{[kl]}, h_{2l}^{[kl]}, \ldots, h_{Ml}^{[kl]})$ is the fast fading channel vector between the M antenna elements of the $l^{th}$ base station and the $k^{th}$ mobile terminal in the $l^{th}$ cell; $h_l^{[kj]}=(h_{1l}^{[kj]}, h_{2l}^{[kj]}, \ldots, h_{Ml}^{[kj]})$ is the fast fading channel vector between the M antenna elements of the $l^{th}$ base station and the $k^{th}$ mobile terminal in the $l^{th}$ cell.

The base station that has been described as performing the steps of the method of the present invention is assumed to be one of the base stations of FIG. 4—say $BS_j$. Consistent with steps 602 and 604 as described above, $BS_j$ first estimates slow fading coefficients for all cells and for all mobile terminals in the network: $\beta_j^{[kl]}$ for all pilot sequences $r_k$, k=1, ..., K and all cells l=1, ..., L. $BS_j$ then sends these estimated coefficients to the other base stations. $BS_j$ receives the slow fading coefficients from the other base stations $\beta_t^{[kl]}$ t≠j. $BS_j$ then forms the aggregate set $\beta_j^{[k]} = \{\beta_l^{[kl']}$: for all pilot sequences $r_k$, k=1, ..., K, and all cells l, l'=1, ..., L}.

The $k^{th}$ mobile terminals in all of the cells across the entire network transmit the pilot sequence $r_k$. As a result of these pilot transmissions, $BS_j$ receives $$Y_j = \sum_{u=1}^{K}\sum_{l=1}^{L} \sqrt{\beta_j^{[ul]}} h_j^{[ul]} r_u.$$

$BS_j$ uses $Y_j$ and these pilots to estimate the fast fading channel vectors, $h_j^{[kj]}$, as $\hat{h}_j^{[kj]}$. Also, as a result of the transmission of the $r_k$ pilot sequences, $BS_j$ then forms M×1 beamforming vectors as follows:

$$w_j^{[kj]} = \frac{\hat{h}_j^{[kj]}}{\|\hat{h}\|_j^{[kj]}},$$

k=1, ..., K. In a similar manner $BS_l$ can be obtained the estimates $\hat{h}_l^{[kt]}$ of the channel vectors $h_l^{[kt]}$ appearing in FIG. 4. The beamforming vectors are to be applied to the M antennas when base stations j and l are transmitting downlink signals as discussed and shown in FIG. 4. By sending the beamforming vectors as defined above, the fast fading coefficients for each mobile terminal are getting positively aligned. For this reason FIG. 4 can be reduced to the diagram of FIG. 5 where only the slow fading coefficients remain. Because these slow fading coefficients vary relatively slowly over time and each of their respective value as applied to the antennas do not vary much from one antenna to another, a reasonable approximation is to reduce the M antennas of each base station to one antenna as shown in FIG. 5. Thus, FIG. 5 shows that the communication network—parts of which are depicted by FIGS. 2 and 3—can be characterized as a communication network where each of the base stations (i.e., nodes of the network) has one transmitter (i.e., one antenna). Further, all of the coefficients (i.e., the slow fading coefficients) of the communication channels are known by all the nodes (i.e., base stations) of the communication network. As a result of cancelling the fast fading coefficients based on the definition of the beamforming vectors causing only the slow fading coefficient to remain, a reasonable approximation of one antenna per base station can be made. Further, because all of the base stations are sharing the aggregate set of the slow fading coefficients, then the communication network can be characterized as having one transmitter at its nodes and where all of the channel coefficients values are known by all the nodes.

It is well known in communication theory that where all of the nodes of the communication network have only one transmitter (e.g., one antenna) and all of the coefficients values are known to all the nodes, then it is possible to craft an algorithm to reduce significantly interference during transmission. Such interference cancellation algorithms are available in the literature and an appropriate one can be selected and used to reduce the interference. In the case discussed here, it is the directed inter-cell interference that will be reduced. In the context of FIG. 5, downlink transmissions by $BS_j$ and $BS_l$ when transmitting downlink symbols, S, they have received over the backhaul links each base station can apply an interference cancellation algorithm to the symbols. The symbol, S, typically carries data (e.g., voice, video, graphics, text and any combination thereof) and may carry other information for operation of the cellular network.

In step 608, $BS_j$ takes the symbol $S^{[kj]}$ that is intended to be transmitted over a downlink channel to the $k^{th}$ mobile terminal in the $j^{th}$ cell and encodes said symbol into a robust symbol $x^{[kj]}$ in accordance with an interference cancellation algorithm. $BS_j$ uses the aggregate set of slow fading coefficients to encode the symbol to be transmitted (i.e., $S^{[kj]}$) over the downlink into a robust signal $x^{[kj]}$ in accordance with a selected interference cancellation algorithm, one of which will be selected and discussed below. The robust signal is a function of the slow fading coefficients and the symbol (received over the back haul links) to be transmitted over the downlink channel. Any appropriate interference cancellation algorithm in the literature can be selected. The symbol $x^{[kj]}$ is more robust than the original symbol $S^{[kj]}$ because when $BS_j$ transmits the symbol $x^{[kj]}$ it takes into account the interferences that it creates to mobile terminals located in other cells, and those interferences are proportional to SFC $\beta_j^{[kl]}$.

One example of an interference cancellation algorithm is [1] entitled *Real Interference Alignment: Exploiting the Potential of Single Antenna Systems*; Abolfazl Seyed Motahari, Shahab veis-Gharan†, Mohammad-Ali Maddah-Ali, and Amir Keyvan Khandani, Department of Electrical and Computer Engineering, University of Waterloo, Waterloo, ON, Canada N2L3G1{abolfazl,shahab,khandani} @cst.u-waterloo.ca, Department of Electrical Engineering and Computer Sciences, University of California-Berkeley-Berkeley, Calif., USA maddaha@eecs:berkeley.edu; arXiv: 0908.2282v2 [cs.IT] 24 Nov. 2009. In selecting [1] the Real Interference Algorithm, which is hereby incorporated herein by reference in its entirety, the transformation of the $S^{[kj]}$ symbol to the $x^{[kj]}$ is explained in some detail.

In [1] (in particular Section VI-C) the K×K Gaussian Interference Channel (GIC) is considered. The fading channel coefficients are assumed being real and constant, which corresponds to our case of slow fading coefficients $\beta_j^{[kl]}$. In [1] the fading coefficients between the j-th transmitter and the l-th receiver are denoted by $h_{lj}$. Thus, for a given k, $h_{lj}$ from [1] corresponds to $\beta_j^{[lk]}$. Adjusting notation from [1] to our notation we summarize the algorithm from [1] as follows.

Let P be the transmit power of base stations. The values m, γ, ε, n are optimization parameters (see [2] for more information on these parameters). Define the integer $$Q = \left\lfloor \gamma P^{\frac{1-\varepsilon}{2(m+\varepsilon)}} \right\rfloor$$

and the signal constellation $R=\{-Q, \ldots, Q\}$, which consists of integers between $-Q$ and $Q$. So if $Q=3$ then $R=\{-3, -2, -1, 0, 1, 2, 3\}$. Next we design transmit directions for $j^{th}$ base station as follows:

$$T_{jr} = \prod_{i=1}^{L} \prod_{l=1}^{L} (\beta_l^{[ik]})^{a_l^{[ik]}},$$

$r=0, \ldots n-1$, where $a_l^{[ik]}$ are some integers satisfying the following constraints 1. $a_l^{[lk]}=0$,
2. $0 \le a_l^{[ik]} \le n$, if $i \ne j$,
3. $0 \le a_l^{[ik]} \le n$ otherwise.

We assume that the symbol $S^{[jk]}$ is from an alphabet of size $|2Q+1|^n$. Hence we can represent the signal $S^{[jk]}$ as a sequence of symbols $s^{[jk]}(r) \in S$, $r=0, \ldots, n-1$. The j-th base station creates the robust symbol as $$x^{[jk]} = A(T_{j0}s^{[jk]}(0) + T_{j1}s^{[jk]}(1) + \ldots + T_{j(n-1)}s^{[jk]}(n-1)),$$

where A is a normalization parameter, defined so that not to exceed the transmit power P. The signal received at the k-th terminal in the j-th cell has the form $$y^{[jk]} = \beta_j^{[jk]}x^{[jk]} + \sum_{l=1, l \ne j}^{L} \beta_l^{[jk]}x^{[lk]} + \frac{1}{\sqrt{M}} \sum_{k'=1, k' \ne k}^{K} \sum_{l=1}^{L} \beta_l^{[jk]}x^{[lk']} + \text{additive noise} \quad (1)$$

The factor $1/\sqrt{M}$ in front of the third double sum in (1) becomes progressively smaller as the number M of base station antennas grows (this is due to the fact that we use M-dimensional beamforming vectors at base stations). In [1] it is shown, that with high probability, the terms of the second sum in (1) are approximately pointing to the "same direction" and therefore the receiver (which is the k-th mobile in the j-th cell) can identify and cancel this sum. The analysis in [2] is based on the theory of Diophantine equations and is not included in this high level summary explanation of the algorithm.

In step 610, $BS_j$ transmits the beamforming vectors applied to the robust signals as follows: $+w_j^{[1j]}x^{[1j]} + w_j^{[2j]}x^{[2j]} + \ldots + w_j^{[Kj]}x^{[Kj]}$.

While various aspects of the present invention have been described above, it should be understood that they have been presented by way of example and not by limitation. It will be apparent to persons skilled in the relevant art(s) the various changes in form and detail can be made therein without departing from the spirit and scope of the present invention. Thus, the present invention should not be limited by any of the above described exemplary aspects, but shoud be defined only in accordance with the following claims and their equivalents.

In addition it should be understood that various equipment of the base stations of the cellular wireless communication network can be implemented in hardware, software running on a server or general purpose computer, firmware or any combination thereof.

What is claimed is:

1. A method for transmitting information from a first base station of a wireless cellular communication network having multiple base stations to a first user located in a first cell of the wireless cellular communication network corresponding to the first base station, wherein (i) the first base station has multiple antennas, (ii) the first user uses a first pilot signal to support communication with the first base station, and (iii) the first pilot signal is used by a second user located in a second cell of the wireless cellular communication network, the method comprising:
    (a) the first base station generating a first robust signal for the first user (A) based on (i) the information to be transmitted to the first user, (ii) slow fading coefficients for the first user, and (iii) slow fading coefficients for the second user and (B) independent of (i) information to be transmitted to the second user and (ii) slow fading coefficients for one or more other users in the wireless cellular communication network that use one or more other pilot signals;

(b) the first base station generating a first beamforming vector for the first user based on fast fading coefficients between the first user and the multiple antennas of the first base station;

(c) the first base station generating a first transmit vector based on the first robust signal and the first beamforming vector; and (d) the first base station transmitting signals from the multiple antennas based on the first transmit vector.

2. The method of claim 1, wherein the first base station generates the first robust signal for the first user (A) based on (i) the information to be transmitted to the first user, (ii) the slow fading coefficients for the first base station, and (iii) slow fading coefficients for all other users in the wireless cellular communication network that use the first pilot signal and (B) independent of (i) information to be transmitted to all other users in the wireless cellular communication network and (ii) slow fading coefficients for all other users in the wireless cellular communication network that use other pilot signals.

3. The method of claim 1, wherein:

the first base station performs step (a) for each user in the first cell to generate a corresponding robust signal for each user in the first cell;

the first base station performs step (b) for each user in the first cell to generate a corresponding beamforming vector for each user in the first cell;

the first base station performs step (c) for each user in the first cell to generate a corresponding transmit vector for each user in the first cell;

the first base station combines the corresponding transmit vectors for all of the users in the first cell to generate a combined transmit vector for the first cell; and the first base station transmits signals from the multiple antennas based on the combined transmit vector.

4. The method of claim 1, wherein the first base station uses a selected interference cancellation algorithm to generate the first robust signal for the first user.

5. The method of claim 4, wherein the selected interference cancellation algorithm is based on an interference alignment method.

6. The method of claim 1, wherein, for the first user:

the first base station generates the slow fading coefficients for the first user;

the first base station generates slow fading coefficients for one or more users in one or more other cells of the wireless cellular communication network that use the first pilot signal;

the first base station transmits the generated slow fading coefficients to one or more other base stations in the wireless cellular communication network;

the first base station receives slow fading coefficients generated by one or more other base stations in the wireless cellular communication network; and the first base station uses the generated slow fading coefficients and the received slow fading coefficients to generate the first robust signal for the first user.

7. The method of claim 6, wherein, for the first user, the first base station generates a first aggregate set of slow fading coefficients based on the generated slow fading coefficients and the received slow fading coefficients.

8. The method of claim 1, wherein the first base station generates the fast fading coefficients for the first user based on a fast fading coefficient pilot sequence received from the first user transmitting the first pilot signal.

9. The method of claim 1, wherein, for the first user, the first base station uses a single set of slow fading coefficients for all antennas of the first base station.

10. A first base station for a wireless cellular communication network having multiple base stations, the first base station being configured to transmit information to a first user located in a first cell of the wireless cellular communication network corresponding to the first base station, wherein (i) the first base station is configured to identify the first user using a first pilot signal to support communication with the first base station and (ii) the first base station is further configured to receive information regarding a second user located in a second cell of the wireless cellular communication network using the first pilot signal as well, wherein the first and second cells are different cells, the first base station comprising:

a first base station (BS) controller; and multiple antennas electrically connected to the first BS controller, wherein:

the first BS controller is configured to generate a first robust signal for the first user (A) based on (i) the information to be transmitted to the first user, (ii) slow fading coefficients for the first user, and (iii) slow fading coefficients for the second user and (B) independent of (i) information to be transmitted to the second user and (ii) slow fading coefficients for one or more other users in the wireless cellular communication network that use one or more other pilot signals;

the first BS controller is further configured to generate a first beamforming vector for the first user based on fast fading coefficients between the first user and the multiple antennas of the first base station;

the first BS controller is further configured to generate a first transmit vector based on the first robust signal and the first beamforming vector; and the multiple antennas are operable to transmit signals based on the first transmit vector.

11. The first base station of claim 10, wherein the first BS controller is configured to generate the first robust signal for the first user (A) based on (i) the information to be transmitted to the first user, (ii) the slow fading coefficients for the first user, and (iii) slow fading coefficients for all other users in the wireless cellular communication network that use the first pilot signal and (B) independent of (i) information to be transmitted to all other users in the wireless cellular communication network and (ii) slow fading coefficients for all other users in the wireless cellular communication network that use other pilot signals.

12. The first base station of claim 10, wherein:

the first BS controller is configured to generate a corresponding robust signal for each user in the first cell;

the first BS controller is configured to generate a corresponding beamforming vector for each user in the first cell;

the first BS controller is configured to generate a corresponding transmit vector for each user in the first cell;

the first BS controller is configured to combine the corresponding transmit vectors for all of the users in the first cell to generate a combined transmit vector for the first cell; and the multiple antennas are operable to transmit signals based on the combined transmit vector.

13. The first base station of claim 10, wherein the first BS controller is configured to use a selected interference cancellation algorithm to generate the first robust signal for the first user.

14. The first base station of claim 13, wherein the selected interference cancellation algorithm is based on an interference alignment method.

15. The first base station of claim 10, wherein, for the first user:
- the first BS controller is configured to generate the slow fading coefficients for the first user;
- the first BS controller is configured to generate slow fading coefficients for one or more users in one or more other cells of the wireless cellular communication network that use the first pilot signal;
- the first BS controller is configured to transmit the generated slow fading coefficients to one or more other base stations in the wireless cellular communication network;
- the first BS controller is configured to receive slow fading coefficients generated by one or more other base stations in the wireless cellular communication network; and
- the first BS controller is configured to use the generated slow fading coefficients and the received slow fading coefficients to generate the first robust signal for the first user.

16. The first base station of claim 15, wherein, for the first user, the first BS controller is configured to generate a first aggregate set of slow fading coefficients based on the generated slow fading coefficients and the received slow fading coefficients.

17. The first base station of claim 10, wherein the first base station is configured to generate the fast fading coefficients for the first user based on a fast fading coefficient pilot sequence received from the first user transmitting the first pilot signal.

18. The first base station of claim 10, wherein, for the first user, the first BS controller is configured to use a single set of slow fading coefficients for all antennas of the first base station.

19. The first base station of claim 10, wherein the information regarding the second user received by the first base station includes the slow fading coefficients for the second user.

* * * * *